Aug. 31, 1926.
O. KONGSRUD
1,597,983
PEDAL SLOT COVER
Filed Jan. 30, 1926
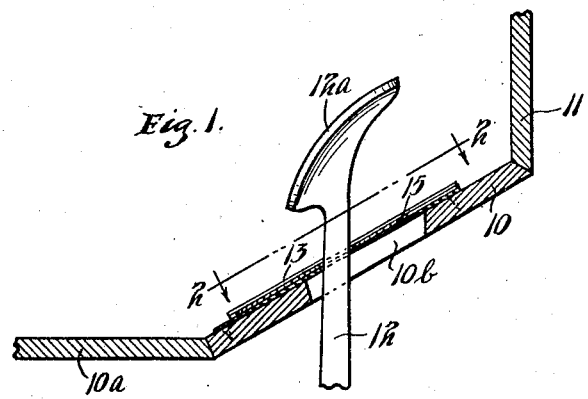
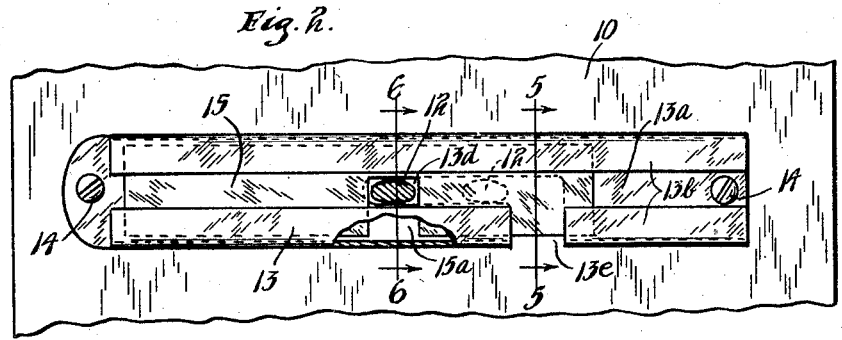
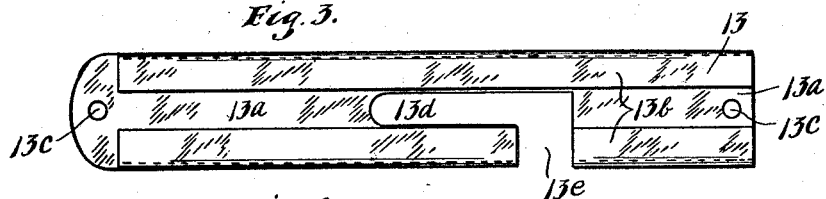
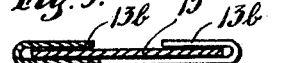
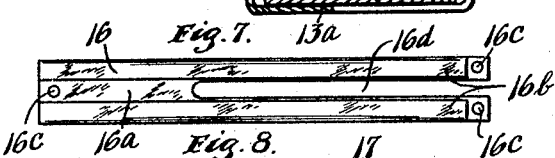
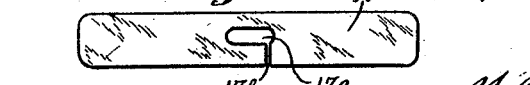
INVENTOR.
OLE KONGSRUD.
BY HIS ATTORNEYS.

Patented Aug. 31, 1926.

1,597,983

UNITED STATES PATENT OFFICE.

OLE KONGSRUD, OF MINNEAPOLIS, MINNESOTA.

PEDAL-SLOT COVER.

Application filed January 30, 1926. Serial No. 84,959.

This invention relates to a device for covering a slot or aperture through which a lever or similar member moves and while the invention is applicable to various devices, it particularly is designed to cover the slot in the floor board of an automobile through which one of the operating levers, such as a brake or clutch lever, moves. In the well known Ford automobile and others, certain parts are operated by pedal levers which move in slots in the floor board, and there is also usually a hand lever moving through a slot in the floor board. These slots give access to a great deal of air which is quite objectionable in cold weather.

It is an object of this invention, therefore, to provide a simple and efficient device for covering the slot and thus preventing the entry of air and which at the same time does not in any way interfere with the operation of the lever.

It is a further object of the invention to provide a device for covering said slot, comprising only two members which are of simple construction and which may be very easily and quickly installed without removing the lever.

It is more specifically an object of the invention to provide a device for covering said slot, comprising members made of comparatively thin sheet material, one of which is bent to form a guide member and has a longitudinal slot therein and the other of which moves in said first mentioned member and has an opening embracing the lever, together with a slot or slit extending laterally from said opening.

These and other objects and advantages of the invention will be fully set forth in the following description made in connection with the accompanying drawings, in which like reference characters refer to the same parts throughout the different views and in which:—

Fig. 1 is a vertical section through the floor board adjacent parts of an automobile, showing a pedal lever projecting through said floor board;

Fig. 2 is a section taken on line 2—2 of Fig. 1 as indicated by the arrows;

Fig. 3 is a plan view of one of the parts of the device;

Fig. 4 is a plan view of the other part of the device;

Fig. 5 is a vertical section taken on line 5—5 of Fig. 2, as indicated by the arrows;

Fig. 6 is a vertical section taken on line 6—6 of Fig. 2, as indicated by the arrows, Figs. 2 and 6 being shown on an enlarged scale;

Fig. 7 is a plan view of one of the parts in modified form, and

Fig. 8 is a plan view of the other part cooperating with the part shown in Fig. 7.

Referring to the drawings, in Fig. 1 the floor board of an automobile is illustrated as 10, from which extends upward the front board or dash 11 and from which extends rearward, the floor $10^a$. The floor board 10 is provided with a longitudinally extending slot $10^b$ and a pedal lever 12 extends upward through the slot $10^b$ having the pedal $12^a$ at its upper end.

In accordance with the present invention a member 13 is provided and while this member may be variously formed, in the embodiment of the invention illustrated it is shown as made from comparatively thin sheet metal. Said member 13 has a bottom portion $13^a$ disposed in one plane and adapted to fit tightly against the floor board 10. Said member 13 is bent upwardly at its sides and then bent reversely to have the portions $13^b$ extending parallel to the bottom portion $13^a$ and spaced therefrom to form narrow guideways. Member 13 is provided with holes $13^c$ at each end adapted to receive the securing screws 14 and said member is also provided intermediate its ends with a slot $13^d$ extending centrally thereof, which slot has a branch or extension $13^e$ at one end extending to one side of the member 13 through both the portions $13^a$ and $13^b$. A plate 15 of simple flat form is also provided, having a width such that said plate is adapted to fit and slide in member 13 between portions $13^a$ and $13^b$. Plate 15 has a slot $15^a$ extending thereinto from one side and to aline substantially flush with the inner side of the slot $13^d$ when members 13 and 15 are assembled. The slot $15^a$ may be formed at its inner side to substantially fit about the side of lever 12.

When the device is to be installed on a car, the member 15 will be inserted in the member 13 and slot $15^a$ brought into alinement with the branch or slot $13^e$. The device can now be placed about the lever 12, said lever entering through slots $13^e$ and $15^a$. When the lever is thus in place, the member 13 is moved upwardly on the floor board so that the portion $13^e$ of slot $13^d$ is above the slot 10$^b$ or above the normal forward position of lever 12. This position is indicated by the dotted outline of lever 12 in Fig. 2. When the parts are so positioned, the fastening screws 14 can be inserted. It will be seen that lever 12 can now be reciprocated as usual in slot 10$^h$ and will also reciprocate in slot 13$^d$ which is alined with slot 10$^b$. The member 15, however, covers slot 13$^d$ and slot 10$^b$ so that the slots are effectively closed and the entry of air is substantially prevented. By providing the slots 13$^e$ and 15$^a$ the device can thus be easily and quickly installed without removal or dis-assembly of any parts of the machine.

In Figures 7 and 8 a slightly modified form of the device is shown comprising a member 16 made of sheet material and having a flat bottom portion 16$^a$ adapted to lie flat against the floor board 10$^b$, said member having its sides bent upwardly and then reversely to form the parts 10$^b$ similar to the parts 13$^b$ of the member 13. The portion 16$^a$ is provided with an elongated slot 16$^d$ extending through one end of the member 16, said slot being substantially the width of the distance between the inner edges of the portions 16$^b$. Member 16 also is provided with the holes 16$^c$ adapted to receive fastening means for securing said member to the floor board. Another member 17 is provided comprising a flat plate adapted to fit and slide in the member 16, said plate having an aperture 17$^a$ formed intermediate its ends, from adjacent one end of which a slot or opening 17$^b$ extends to one side of member 17. When the device shown in Figs. 7 and 8 is to be installed, the member 17 will be placed about lever 12 by flexing said member and separating the edges of slit 17$^b$ so that the lever can be entered in the aperture 17$^a$. Member 17 is then again brought to flat position and the opening 17$^a$ will thus snugly embrace lever 12. With the member 17 then elevated somewhat above the floor board 10, the member 16 is slid over member 17, the end through which slot 16$^d$ extends being placed over member 17. Member 17 thus slides into the member 16 until substantially midway between the holes 16$^c$. The fastening means can then be applied through said holes and plate 17 will slide with the lever 12, sufficient movement being permitted so that plate 17 will not engage the fastening means. The plate 17 effectively closes slot 10$^b$ and also the slot 16$^d$ so that the entry of air through slot 10$^b$ is substantially prevented. The device comprising parts 16 and 17 can thus be quickly and easily installed in the automobile without removal or change in any parts.

From the above description it is seen that applicant has provided an extremely simple and efficient device for closing the lever slot and preventing the entry of air. The device comprises only two parts which are of extremely simple construction and it can be very easily and inexpensively made. The device has been amply demonstrated in actual practice and found to be very successful and efficient.

It will, of course, be understood that various changes may be made in the form, details, arrangement and proportions of parts without departing from the scope of applicant's invention, which, generally stated, consists in a device capable of carrying out the objects above described, in the novel parts and combination of parts disclosed and defined in the appended claim.

What is claimed is:

A cover device for a slot in which a lever reciprocates, comprising two members, one of which is provided with means to slidably guide the other in an endwise direction, said means being constructed to provide a tight sliding joint between said members, one of said members being provided with a slot extending in the direction crossing the direction of movement of the lever, the other of said members being provided with a slot designed to register with said last named slot, whereby when said members are assembled with their transverse slots in registry the cover device may be applied laterally to the lever.

In testimony whereof I affix my signature.

OLE KONGSRUD.